US008018506B2

(12) United States Patent
Takane

(10) Patent No.: US 8,018,506 B2
(45) Date of Patent: Sep. 13, 2011

(54) IMAGE TAKING APPARATUS WITH SHADING CORRECTION

(75) Inventor: Yasuo Takane, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1004 days.

(21) Appl. No.: 11/860,882

(22) Filed: Sep. 25, 2007

(65) Prior Publication Data

US 2008/0074515 A1    Mar. 27, 2008

(30) Foreign Application Priority Data

Sep. 25, 2006   (JP) .................................. 2006-259654

(51) Int. Cl.
H04N 9/64 (2006.01)

(52) U.S. Cl. ........................................................ 348/251

(58) Field of Classification Search .................. 348/251, 348/223.1, 224.1, 225.1
See application file for complete search history.

(56) References Cited

U.S. PATENT DOCUMENTS

| 5,283,632 | A  | * | 2/1994  | Suzuki et al. | 348/223.1 |
| 6,831,687 | B1 | * | 12/2004 | Suzuki        | 348/251   |
| 2005/0185066 | A1 | * | 8/2005 | Nishimura     | 348/229.1 |
| 2006/0244848 | A1 | * | 11/2006 | Hori         | 348/251   |
| 2006/0274190 | A1 | * | 12/2006 | Kalevo       | 348/345   |
| 2008/0259186 | A1 | * | 10/2008 | Wang et al.  | 348/238   |

FOREIGN PATENT DOCUMENTS

| JP | 8-279902 A    |   | 10/1996 |
| JP | 2805100 B2    |   | 7/1998  |
| JP | 2000-41179 A  |   | 2/2000  |
| JP | 2005-277618 A |   | 10/2005 |
| JP | 2005-278004 A |   | 10/2005 |
| JP | 2005-303785 A |   | 10/2005 |
| JP | 2006148881 A  | * | 6/2006  |

OTHER PUBLICATIONS

Notice of Reasons for Rejection, dated Oct. 29, 2010, issued in corresponding JP Application No. 2006-259654, 7 pages in English and Japanese.

* cited by examiner

*Primary Examiner* — Jason Whipkey
(74) *Attorney, Agent, or Firm* — Sughrue Mion, PLLC

(57) ABSTRACT

An image taking apparatus according to an aspect of the present invention comprises: a light source discrimination device which discriminates a light source in a photographing environment; and a shading correction device which makes shading correction according to the light source discriminated by the light source discrimination device for an image photographed under the light source in the photographing environment. According to the image taking apparatus of the present invention, the shading correction is made according to the light source in the photographing environment, whereby the excellent image quality can be maintained by appropriately making shading correction even if the light source is changed.

12 Claims, 12 Drawing Sheets

IMAGE TAKING APPARATUS WITH SHADING CORRECTION

BACKGROUND OF THE INVENTION

1. Field of the Invention

The present invention relates to an image taking apparatus, and more particularly to an image taking apparatus which can maintain excellent image quality by appropriately making shading correction even if a light source is changed.

2. Description of the Related Art

Generally, in an image taking apparatus such as a digital camera having a lens, shading occurs in which the light quantity decreases nearer to the periphery of photographed image, caused by the lens and the device. Conventionally, a method for correcting the shading has been proposed.

For example, Japanese Patent Application Laid-Open No. 8-279902 disclosed that a shading corrected video signal is obtained by making the arithmetical operation between the shading correction factor preset based on the angle of incidence for a light flux incident upon each photocell and a digital video signal. Japanese Patent Application Laid-Open No. 2005-277618 disclosed that the shading correction is made by adjustment according to the shading factor based on the distance from the correction center of an image. Japanese Patent No. 2805100 disclosed that a shading correction signal is formed based on the shading correction data obtained by integrating the level data in the horizontal direction, and the shading correction data obtained by integrating the level data in the vertical direction, and the shading correction is automatically made based on the formed shading correction signal at the time of actual photographing. Japanese Patent Application Laid-Open No. 2000-41179 disclosed that the shading correction is made in accordance with a photographic scene by selecting the shading correction data according to the f-number, zoom position and kind of lens.

SUMMARY OF THE INVENTION

However, in the above patent documents, since the same shading correction is made even if the light source in the photographing environment is changed (e.g., when the camera is moved from outdoors (sun) to indoors (fluorescent light)), there was a problem that the shading correction is appropriately made for the image taken outdoors, but the shading correction is not necessarily appropriately made for the image taken indoors.

The present invention has been achieved in the light of the above-mentioned problem, and it is an object of the invention to maintain the excellent image quality by appropriately making shading correction even if the light source is changed.

The present invention has been achieved to solve the above-mentioned problem, and a first aspect provides an image taking apparatus comprising: a light source discrimination device which discriminates a light source in a photographing environment; and a shading correction device which makes shading correction according to the light source discriminated by the light source discrimination device for an image photographed under the light source in the photographing environment.

With the invention of the first aspect, the shading correction is made according to the light source in the photographing environment, whereby the excellent image quality can be maintained by appropriately making shading correction even if the light source is changed.

A second aspect of the present invention provides an image taking apparatus comprising: a light source discrimination device which discriminates a light source in a photographing environment; a storage device which stores a correction factor; a write device which writes the correction factor according to the light source discriminated by the light source discrimination device into the storage device; and a shading correction device which makes shading correction for an image photographed under the light source in the photographing environment based on a shading correction operation expression including the correction factor stored in the storage device.

With the invention of the second aspect, the shading correction is made based on the shading correction operation expression including the correction factor stored in the storage device (correction factor written according to the discriminated light source), whereby it is possible to make the optimal shading correction according to the light source for the image data photographed under the light source in the specific photographing environment.

Accordingly, the excellent image quality can be maintained by appropriately making shading correction even if the light source is changed.

A third aspect of the present invention provides an image taking apparatus comprising: a light source discrimination device which discriminates a light source in a photographing environment; a storage device which stores a correction table; a rewrite device which rewrites the correction table stored in the storage device with the correction table according to the light source discriminated by the light source discrimination device; and a shading correction device which makes shading correction for an image photographed under the light source in the photographing environment based on the correction table stored in the storage device.

With the invention of the third aspect, the shading correction is made based on the correction table stored in the storage device (correction table written according to the discriminated light source), whereby it is possible to make the optimal shading correction according to the light source for the image data photographed under the light source in the specific photographing environment. Further, since the shading correction is made based on the correction table, the minute correction can be made.

A fourth aspect of the present invention provides an image taking apparatus comprising: a light source discrimination device which discriminates a light source in a photographing environment; a storage device which stores a correction factor for each light source; a selector which switches to a correction factor according to the light source discriminated by the light source discrimination device among the correction factors stored in the storage device, based on the discrimination result of the light source discrimination device; and a shading correction device which makes shading correction for an image photographed under the light source in the photographing environment, based on a shading correction operation expression including the correction factor switched by the selector, wherein the light source discrimination device is disposed at the former stage of the shading correction device.

With the invention of the fourth aspect, since the light source discrimination device is disposed at the former stage of the correction operation device, the light source can be judged at earlier stage, so that the load on the latter stage is reduced.

A fifth aspect of the present invention provides an image taking apparatus comprising: a light source discrimination device which discriminates a light source in a photographing environment; a storage device which stores a correction table for each light source; a selector which switches a correction table according to the light source discriminated by the light source discrimination device among the correction tables stored in the storage device, based on the discrimination result of the light source discrimination device; and a shading correction device which makes shading correction for an image photographed under the light source in the photographing environment, based on the correction table switched by the selector, wherein the light source discrimination device is disposed at the former stage of the shading correction device.

With the invention of the fifth aspect, the light source discrimination device disposed at the former stage of the shading correction device discriminates the kind of light source in the photographing environment, and the selector switches the correction table for each light source in the photographing environment, based on the discrimination result, whereby it is possible to make the optimal shading correction for the image data under each light source in the photographing environment. Accordingly, the excellent image quality can be maintained by appropriately making shading correction even if the light source is changed. Further, since the shading correction is made based on the correction table, the minute correction can be made.

A sixth aspect of the present invention provides an image taking apparatus comprising: a light source discrimination device which discriminates a light source in a photographing environment; a storage device which stores a correction factor; a correction factor compensation device which compensates the correction factor stored in the storage device for the correction factor according to the light source discriminated by the light source discrimination device; and a shading correction device which makes shading correction for an image photographed under the light source in the photographing environment, based on a shading correction operation expression including the correction factor compensated by the correction factor compensation device.

With the invention of the sixth aspect, the correction factor is compensated for the correction factor according to the light source discriminated by the light source discrimination device, and the shading correction is made for the image photographed under the light source in the specific photographing environment, based on the shading correction operation expression including the correction factor compensated. Accordingly, it is unnecessary to store the correction factor for each light source. That is, the number of man-hours in the manufacture can be reduced. Also, the circuit scale is smaller.

A seventh aspect of the present invention provides the image taking apparatus according to the second aspect, wherein the light source discrimination device discriminates the light source in the photographing environment, based on the light source information obtained from an image pickup device and the light source information of one frame before.

With the invention of the seventh aspect, the circuit scale for judging the light source can be reduced.

An eighth aspect of the present invention provides the image taking apparatus according to any one of the first to seventh aspects, further comprising a comparison device which compares color balances at four corners and a color balance at a central part of a through image while the through image is displayed, wherein the light source discrimination device discriminates the light source in the photographing environment, based on the comparison results of the comparison device.

With the invention of the eighth aspect, the light source can be judged continuously while the through image is displayed, whereby the shading correction can be made according to the judged light source. Further, the circuit scale can be reduced, and the fluorescent light or the like can be detected at high speed.

A ninth aspect of the present invention provides the image taking apparatus according to any one of the second, fourth and sixth aspects, wherein the correction information according to the lens inherent information and zoom focal distance information is reflected to the correction factor included in the shading correction operation expression, and the image taking apparatus further comprises an adjustment device which adjusts the convergence point of automatic white balance according to the light source in the photographing environment discriminated by the light source discrimination device.

With the invention of the ninth aspect, the image quality can be improved in any optical system.

With the present invention, the excellent image quality can be maintained by appropriately making shading correction even if the light source is changed.

DETAILED DESCRIPTION OF THE PREFERRED EMBODIMENTS

A digital camera according to an embodiment of the present invention will be described below with reference to the drawings.

Figure 1:
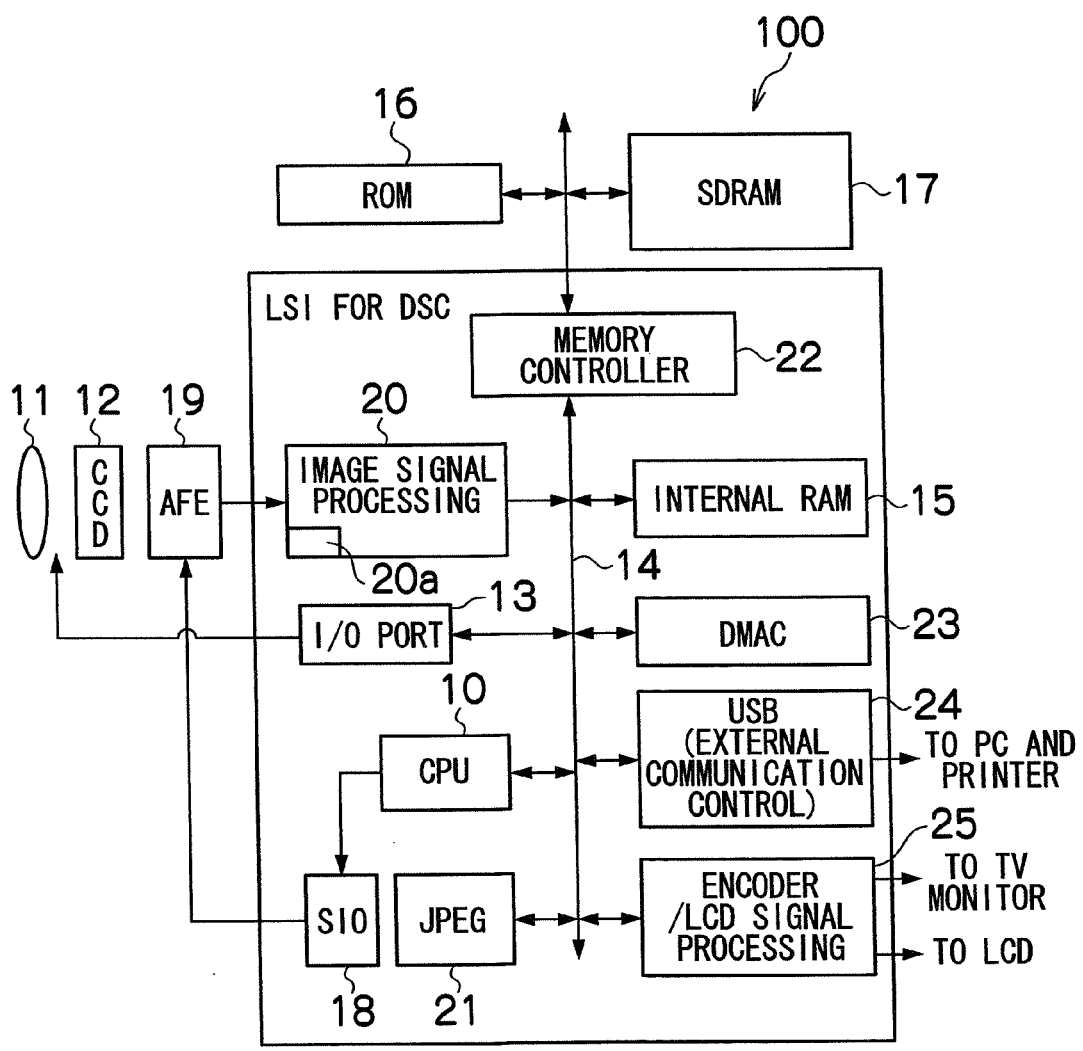
FIG. 1 is a block diagram for explaining the hardware configuration of a digital camera according to an embodiment of the present invention.

FIG. 1 is a block diagram for explaining the hardware configuration of the digital camera according to an embodiment of the invention.

In the digital camera 100 as shown in FIG. 1, a signal from each operation part (not shown) is inputted into a CPU 10, and the CPU 10 controls each circuit of the digital camera 100 based on the input signal. For example, a lens drive control, a photographing operation control, an image processing control, an image data recording/reproducing control and a display control are performed.

The digital camera 100 comprises an image taking lens 11, and a solid-state image pickup element 12 that is a CCD of honeycomb pixel arrangement, CCD of Bayer method, or CMOS sensor. A diaphragm, an infrared cut filter, and an optical low pass filter (not shown) are disposed between both. The CPU 10 control a lens drive part (not shown) via an I/O PORT 13 to adjust the position of the image taking lens 11 to the focus position, and controls a numerical aperture of the aperture via an aperture drive part (not shown) to adjust the exposure amount to the proper exposure value.

The CPU 10 functions as a control device which controls the camera system in accordance with a predetermined program, and also functions as an arithmetic operation device which performs various kinds of arithmetic operations including an automatic exposure (AE) operation, an automatic focusing (AF) operation, and a white balance (WB) adjustment operation. All or a part of these functions may be performed by an image signal processor 20.

A main memory (internal RAM) 15 connected via a bus 14 to the CPU 10 stores a program performed by the CPU 10 and various kinds of data required for the control. A non-volatile memory 16 such as a flash ROM stores data specifying a white balance adjustment area, shading correction characteristics, CCD pixel defect information, and various kinds of constants/information regarding the camera operation.

Also, a memory (SDRAM) 17 is used as a program expansion area and an arithmetic operation working area of the CPU 10, as well as a temporary storage area of image data or voice data is included in the CPU 10. The ROM 16 or SDRAM 17 is accessed via a memory controller 22.

Also, the CPU 10 drives a solid-state image pickup element 12 via an image pickup device drive part (not shown), and outputs a subject image picked up through the image taking lens 11 as a color signal. This outputted color signal is inputted into an AFE 19 (Analog Front End processor) controlled via an SIO 18 from the CPU 10. In the AFE 19, a CDS (not shown) makes a process for removing the amplification noise or reset noise from the inputted color signal, an ADC (not shown) that is a variable gain amplifier makes the gain adjustment, and an A/D conversion part (not shown) converts analog data into digital data, which is then outputted. This outputted digital data (hereinafter referred to as image data) is inputted into an image signal processing part 20. The image signal processing part 20 performs various kinds of signal processing such as an AWB operation, and comprises a correction operation circuit 20a.

Figure 2:
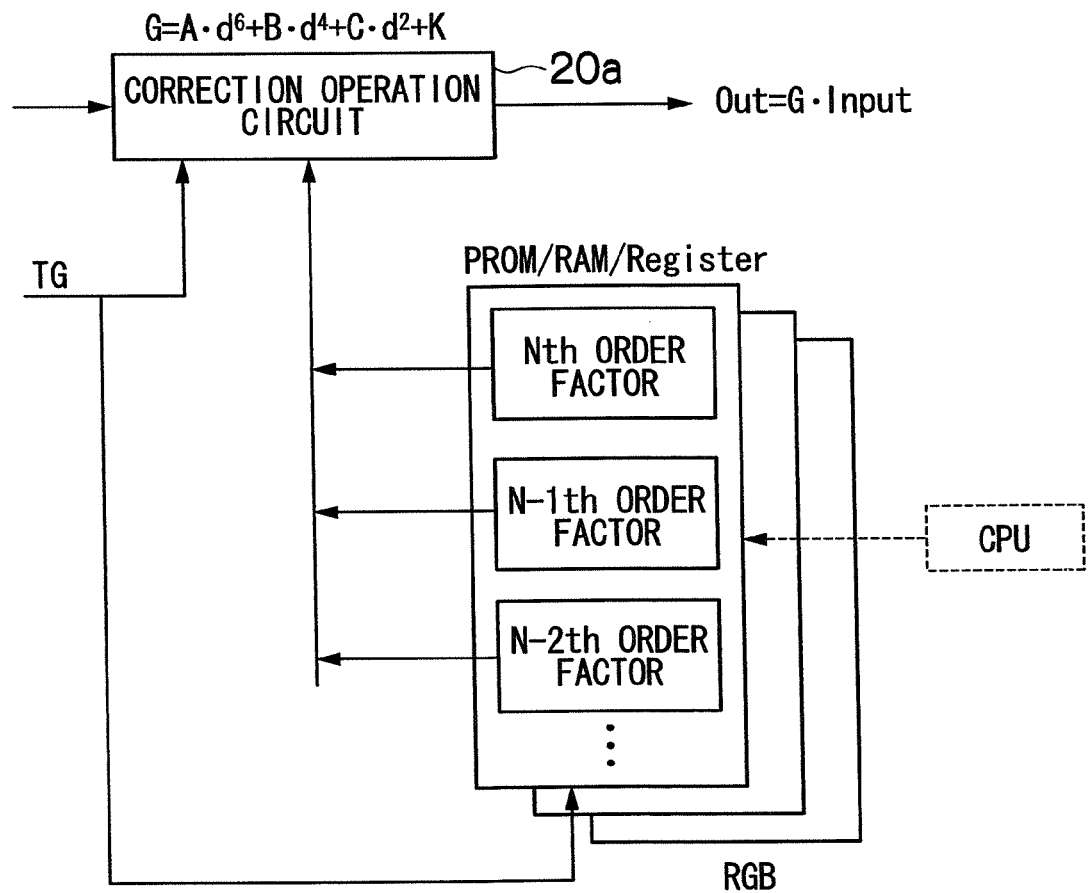
FIG. 2 is a circuit example (first embodiment) which makes the optimal shading correction for image data under each light source in the photographing environment.

The correction operation circuit 20a is the circuit for making shading correction, as shown in FIG. 2. The correction operation circuit 20a makes the optimal shading correction for image data based on a correction operation expression including the correction factor for each light source in the photographing environment by changing the correction factor for each light source in the photographing environment. The correction operation expression including the correction factor can be represented by the following sixth order expression (or higher or lower order than sixth).

Correction operation expression $G = ad^6 + bd^4 + cd^2 + K$    [Formula 1]

Where a, b and c are correction factors, and d is the distance from the center of screen. The correction factors are stored for each light source or each RGB in the storage device such as ROM 16, PROM, RAM or Register. For example, the standard light correction factor A, fluorescent light correction factor B, mercury light correction factor C, . . . are stored.

The image data subjected to various kinds of signal processing in the image signal processing part 20 is compressed into a JPEG image by a compression/decompression processing part 21, as needed, and stored via the bus 14 and the memory controller 22 in the SDRAM 17. A DMAC 23 is a product sum functional unit, whereby the processing of the image signal processing part 20 is accelerated.

The image data can be outputted to a personal computer or a printer via an external communication control part 24 such as USB connected via the bus 14 to the CPU 10. Also, the image based on the image data can be displayed on an image display unit such as a TV monitor or LCD via an encoder/LCD processing part 25 connected via the bus 14 to the CPU 10.

First Embodiment

Figure 3:
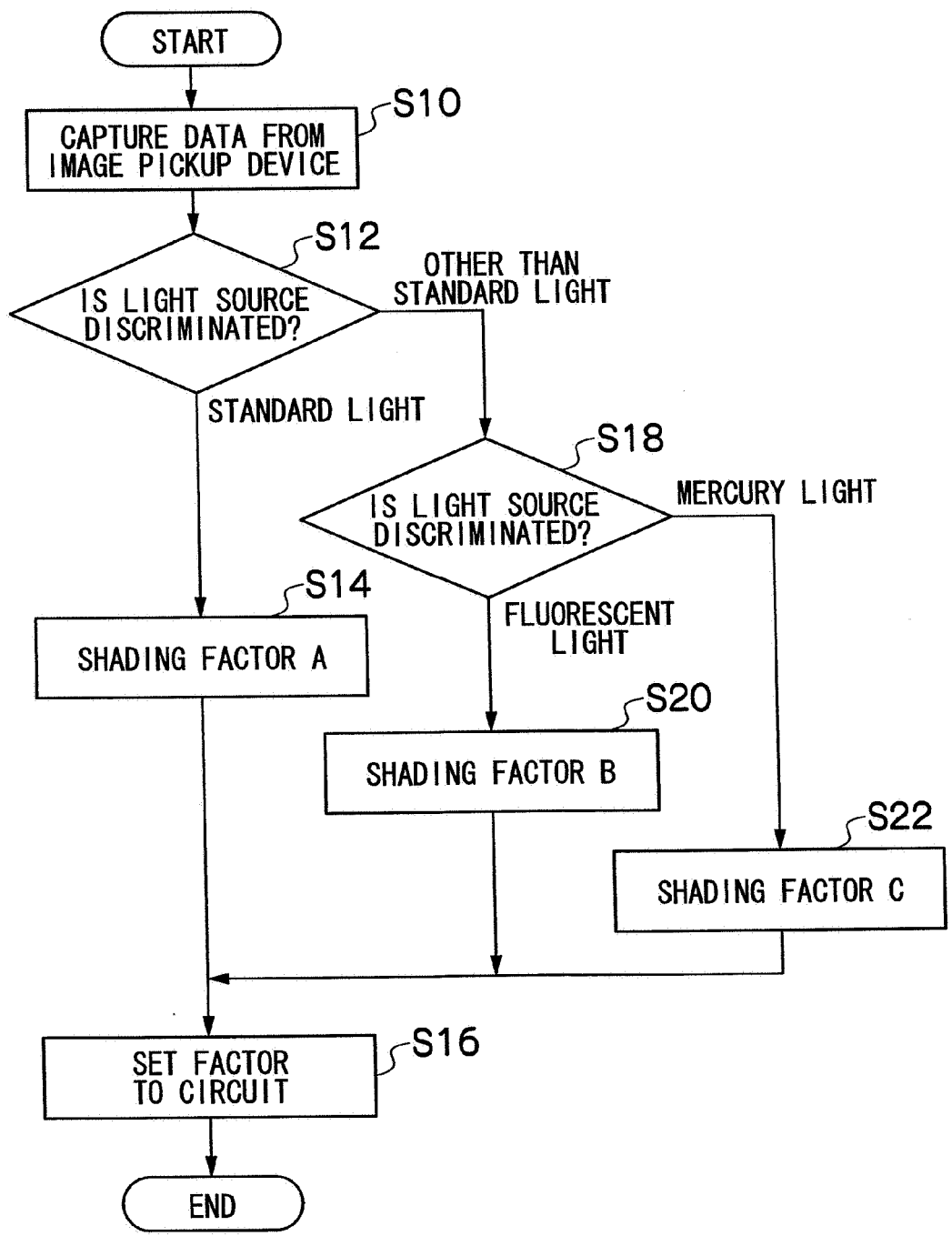
FIG. 3 is a flowchart for explaining the operation (first embodiment) which makes the optimal shading correction for image data under each light source in the photographing environment.

In the digital camera 100 with the above configuration, the operation for making the optimal shading correction based on a correction operation expression including the correction factor for image data for each light source in the photographing environment by changing the correction factor for each light source (standard light, fluorescent light, mercury light, etc.,) in the photographing environment will be described below with reference to FIG. 3. The following process is implemented by executing a predetermined program under the control of the CPU 10.

First of all, to discriminate the light source in the photographing environment, data is captured from an image pickup device such as an AE or AWB device (step S10). The light source in the photographing environment is discriminated based on this captured data (step S12). Alternatively, a device (e.g., a light source setting switch) with which the user manually sets the kind of light source may be provided to discriminate the light source in the photographing environment based on this setting.

If the light source in the photographing environment is discriminated as the standard light (step S12: standard light), the standard light correction factor A is read from the ROM 16 (step S14), and written into the storage device such as PROM, RAM or Register (step S16). That is, the correction factor is set in the correction operation circuit 20a. In this case, the correction operation circuit 20a makes the shading correction for the image data based on the correction operation expression including the written standard light correction factor A.

On the other hand, if the light source in the photographing environment is discriminated as the fluorescent light, but not the standard light (step S12: other than the standard light, step S18: fluorescent light), the fluorescent light correction factor B is read from the ROM 16 (step S20), and written into the storage device such as PROM, RAM or Register (step S16). That is, the correction factor is set in the correction operation circuit 20a. In this case, the correction operation circuit 20a makes the shading correction for the image data based on the correction operation expression including the written fluorescent light correction factor B.

Also, if the light source in the photographing environment is discriminated as the mercury light, but not the standard light (step S12: other than the standard light, step S18: mercury light), the mercury light correction factor C is read from the ROM 16 (step S22), and written into the storage device such as PROM, RAM or Register (step S16). That is, the correction factor is set in the correction operation circuit 20*a*. In this case, the correction operation circuit 20*a* makes the shading correction for the image data based on the correction operation expression including the written mercury light correction factor C.

As described above, with the digital camera 100 of this embodiment, the shading correction is made based on the shading correction operation expression including the correction factor stored in the storage device such as PROM, RAM or Register (correction factor written according to the light source discriminated at step S12 or step S18), whereby it is possible to make the optimal shading correction according to the light source for the image data taken under the light source in the specific photographing environment.

Accordingly, the excellent image quality can be maintained by appropriately making shading correction even if the light source is changed.

A modification of the first embodiment will be described below.

Figure 4:
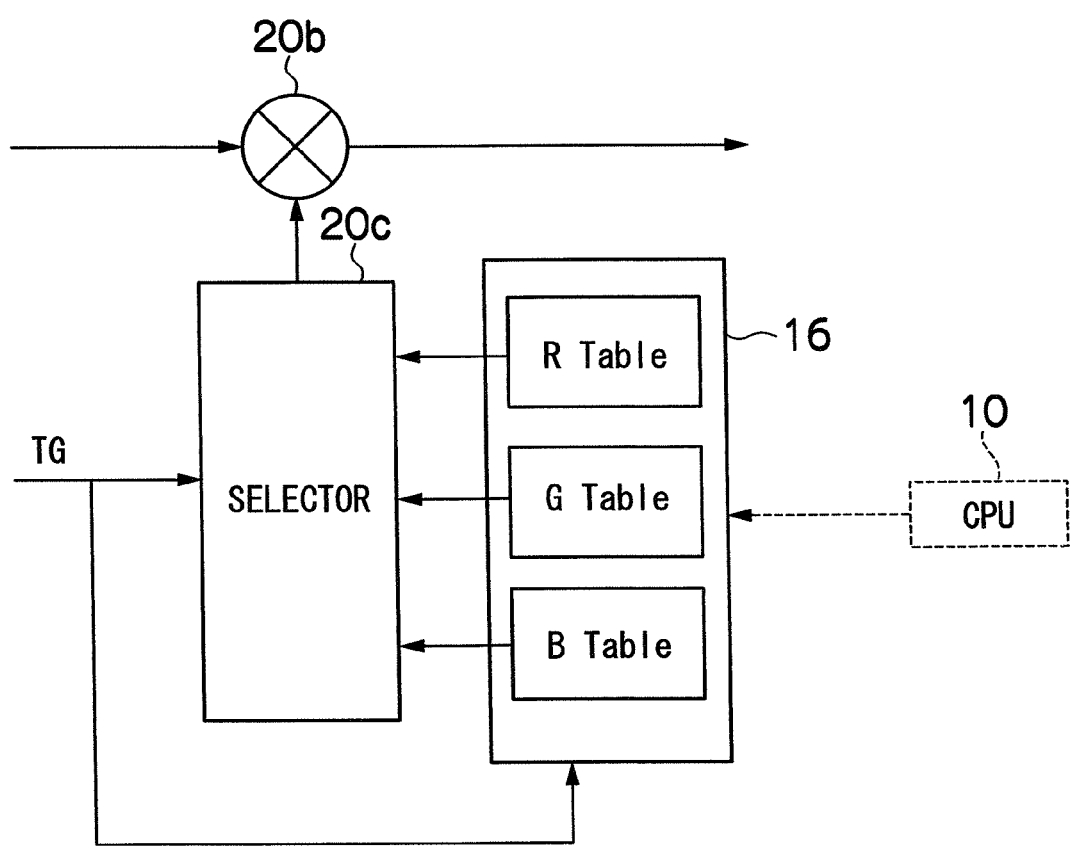
FIG. 4 is a circuit example (modification of the first embodiment) which makes the optimal shading correction for image data under each light source in the photographing environment.

In this modification of the digital camera 100 with the above configuration, a multiplier 20*b* and a selector 20*c* are provided, instead of the correction operation circuit 20*a* of this embodiment, and a table (e.g., including the correction factor based on an inverse curve of the shading curve) is stored in the storage device such as the ROM 16, as shown in FIG. 4. The table is stored for each light source or each RGB. For example, the standard light correction table A, fluorescent light correction table B, mercury light correction table C, . . . are stored.

The operation of the digital camera 100 of this modification is the same as in the first embodiment, whereby the different points will be mainly described below with reference to FIG. 3.

That is, if the light source in the photographing environment is discriminated as the standard light (step S12: standard light), the standard light correction table A is read from the ROM 16 (step S14), and written into the storage device such as PROM, RAM or Register (step S16). In this case, the multiplier 20*b* makes the shading correction for the image data based on the written standard light correction table A.

On the other hand, if the light source in the photographing environment is discriminated as the fluorescent light, but not the standard light (step S12: other than the standard light, step S18: fluorescent light), the fluorescent light correction table B is read from the ROM 16 (step S20), and written into the storage device such as PROM, RAM or Register (step S16). In this case, the multiplier 20*b* makes the shading correction for the image data based on the written fluorescent light correction table B.

Also, if the light source in the photographing environment is discriminated as the mercury light, but not the standard light (step S12: other than the standard light, step S18: mercury light), the mercury light correction table C is read from the ROM 16 (step S22), and written into the storage device such as PROM, RAM or Register (step S16). In this case, the multiplier 20*b* makes the shading correction for the image data based on the written mercury light correction table C.

The selector 20*c* switches the table for each color (RGB) based on the reference signal or color signal from a TG (timing generator).

As described above, with the digital camera 100 of this modification, the shading correction is made in accordance with the correction table stored in the storage device such as PROM, RAM or Register (correction table written according to the light source discriminated at step S12 or step S18), whereby it is possible to make the optimal shading correction according to the light source for the image data taken under the light source in the specific photographing environment. Further, the minute correction can be made because the shading correction is based on the correction table.

Second Embodiment

In the digital camera 100 with the above configuration, the operation for making the optimal shading correction based on a correction operation expression including the changed correction factor for the image data for each light source in the photographing environment by changing the correction factor for each light source (standard light, fluorescent light, mercury light, etc.,) in the photographing environment will be described below.

Figure 5:
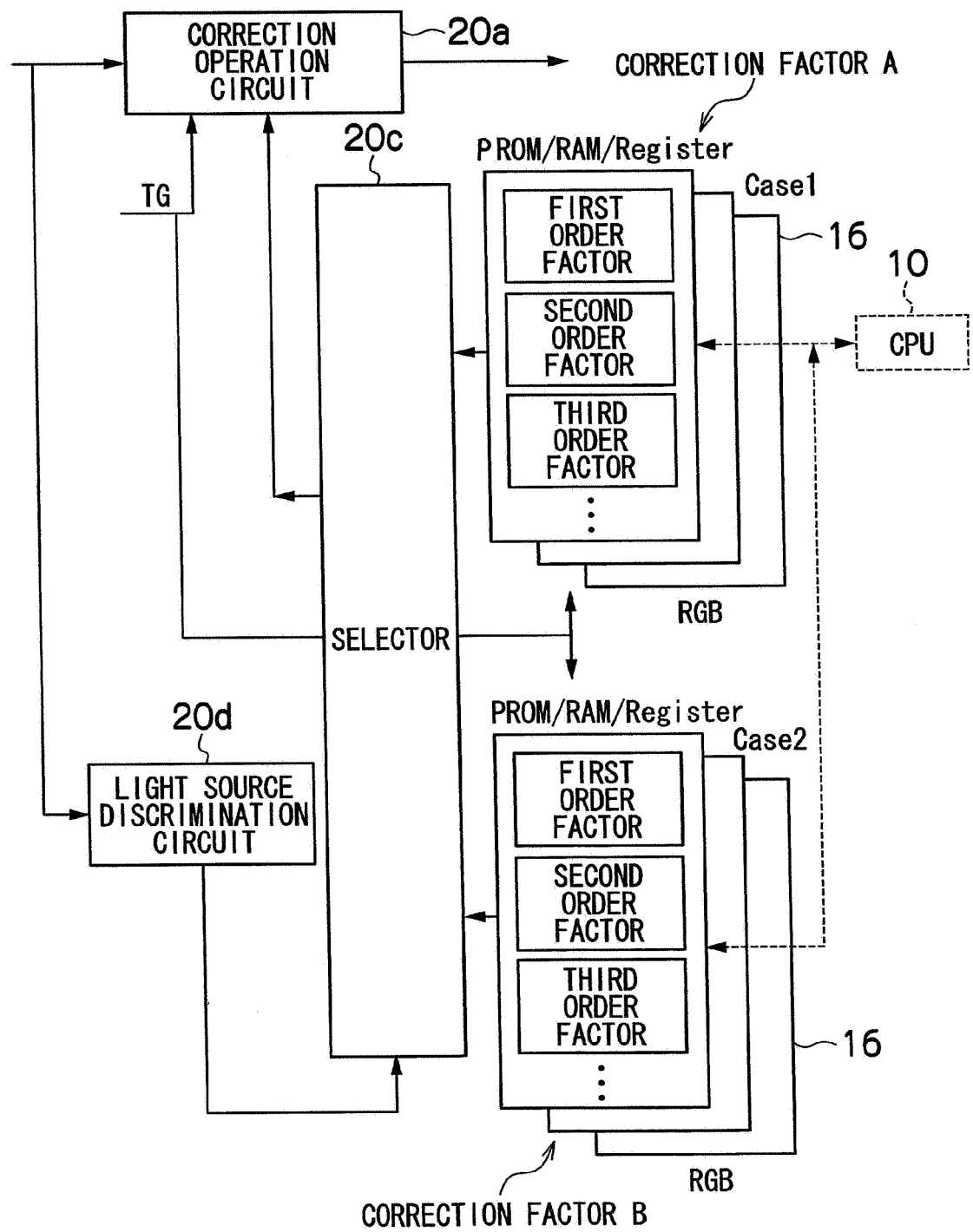
FIG. 5 is a circuit example (second embodiment) which makes the optimal shading correction for image data under each light source in the photographing environment.

The digital camera 100 of this embodiment comprises a light source discrimination circuit 20d which discriminates the light source in the photographing environment, a storage unit 16 such as ROM, RAM or Register which stores the correction factor for each light source, a selector 20*c* which switches to the correction factor according to the light source discriminated by the light source discrimination circuit among the correction factors stored in the storage unit 16, based on the discrimination result of the light source discrimination circuit, and a correction operation circuit 20*a* which makes shading correction for the image taken under the light source in the specific photographing environment based on the shading correction operation expression including the correction factor switched by the selector 20*c*, as shown in FIG. 5. The light source discrimination circuit 20d is disposed at the former stage of the correction operation circuit 20d. This point is a main feature of this embodiment.

The operation of the digital camera 100 of this embodiment is the same as in the first embodiment, whereby the different points will be mainly described below with reference to FIG. 3.

That is, if the light source in the photographing environment is discriminated as the standard light (step S12: standard light), a correction factor is switched to the standard light correction factor A on the upper side of FIG. 5 (step S14). In this case, the correction operation circuit 20*a* makes the shading correction for the image data based on the switched standard light correction factor A.

On the other hand, the light source in the photographing environment is discriminated as the fluorescent light, but not the standard light (step S12: other than the standard light, step S118: fluorescent light), a correction factor is switched to the fluorescent light correction factor B on the lower side of FIG. 5 (step S20). In this case, the correction operation circuit 20*a* makes the shading correction for the image data based on the switched fluorescent light correction factor B.

Also, if the light source in the photographing environment is discriminated as the mercury light, but not the standard light, the same operation is performed.

The selector 20*c* switches the table for each color (RGB) based on the reference signal or color signal from the TG (timing generator).

As described above, with the digital camera 100 of this embodiment, the shading correction is made based on the correction factor switched by the selector 20*c*, whereby it is possible to make the optimal shading correction according to the light source for the image data taken under the light source in the specific photographing environment. Accordingly, the excellent image quality can be maintained by appropriately making shading correction even if the light source is changed.

Also, since the light source discrimination circuit 20d is disposed at the former stage of the correction operation circuit 20a, the light source can be judged at the earlier stage, so that the load on the latter stage is reduced.

A modification of the second embodiment will be described below.

Figure 6:
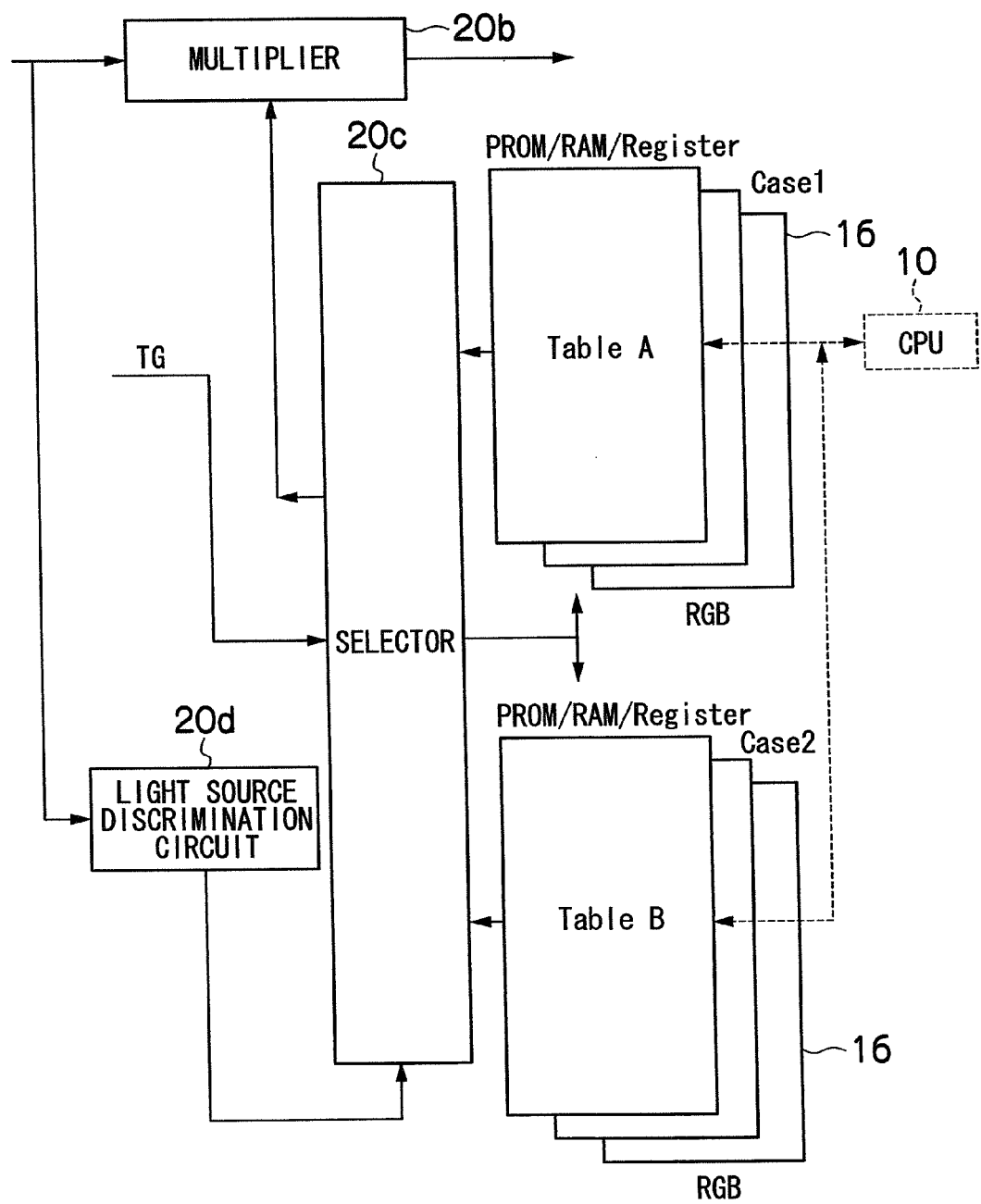
FIG. 6 is a circuit example (modification of the second embodiment) which makes the optimal shading correction for image data under each light source in the photographing environment.
Figure 7:
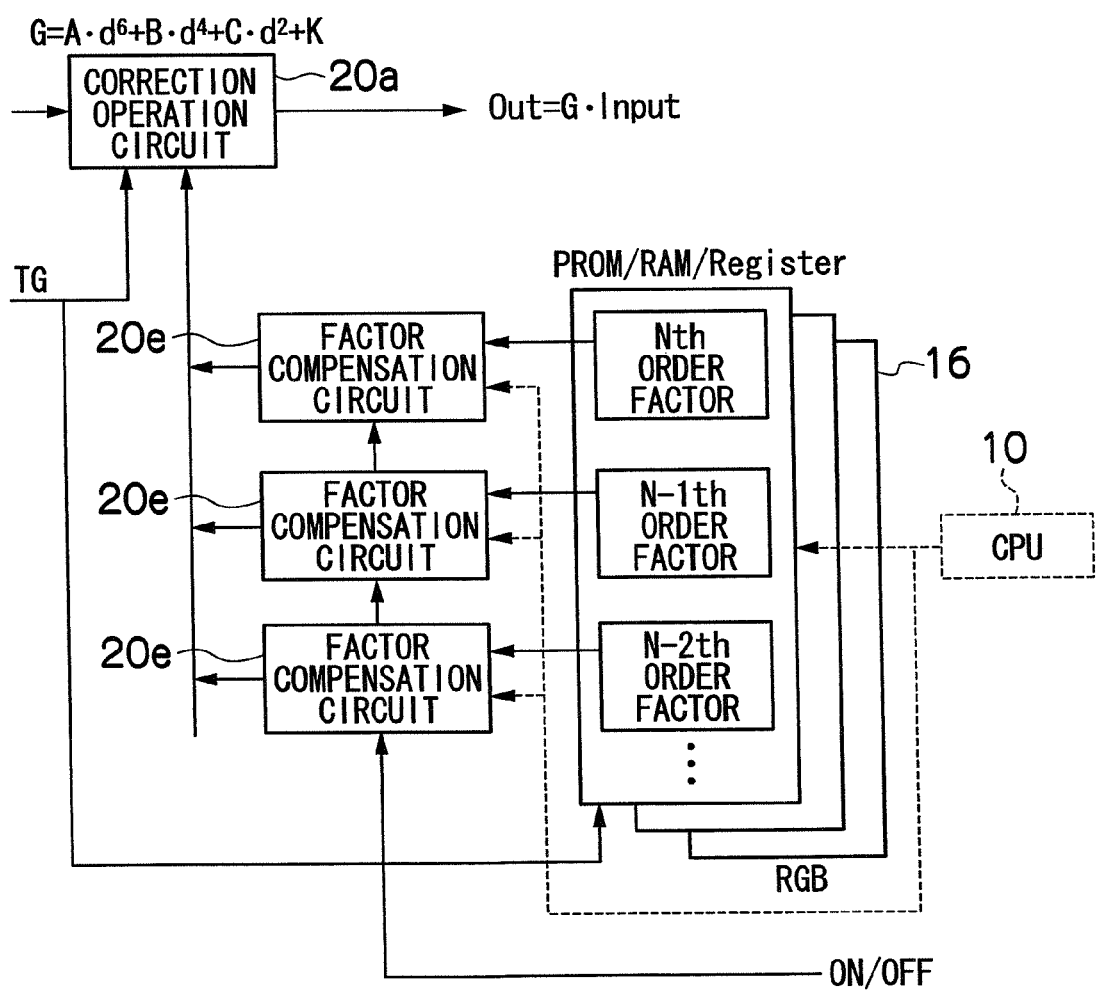
FIG. 7 is a circuit example (third embodiment) which makes the optimal shading correction for image data under each light source in the photographing environment.

In this modification of the digital camera 100 with the above configuration, a multiplier 20b is provided, instead of the correction operation circuit 20a of this embodiment, and a correction table (e.g., including the correction factor for each pixel based on an inverse curve of the shading curve) is stored in the storage device such as the ROM 16, as shown in FIG. 6. The table is stored for each light source or each RGB. For example, the standard light correction table A, fluorescent light correction table B, mercury light correction table C, . . . are stored.

The operation of the digital camera 100 of this modification is the same as in the first embodiment, whereby the different points will be mainly described below with reference to FIG. 3.

That is, if the light source in the photographing environment is discriminated as the standard light (step S12: standard light), a correction table is switched to the standard light correction table A on the upper side of FIG. 6 (step S14). In this case, the multiplier 20b makes the shading correction for the image data based on the switched standard light correction table A.

On the other hand, the light source in the photographing environment is discriminated as the fluorescent light, but not the standard light (step S12: other than the standard light, step S18: fluorescent light), a correction table is switched to the fluorescent light correction table B on the lower side of FIG. 5 (step S20). In this case, the multiplier 20b makes the shading correction for the image data based on the switched fluorescent light correction table B.

Also, if the light source in the photographing environment is discriminated as the mercury light, but not the standard light, the same operation is performed.

The selector 20c switches the table for each color (RGB) based on the reference signal or color signal from the TG (timing generator).

As described above, with the digital camera 100 of this modification, the shading correction is made based on the correction table switched by the selector 20c, whereby it is possible to make the optimal shading correction according to the light source for the image data taken under the light source in the specific photographing environment. Accordingly, the excellent image quality can be maintained by appropriately making shading correction even if the light source is changed. Also, since the light source discrimination circuit 20d is disposed at the former stage of the correction operation circuit 20a, the light source can be judged at the earlier stage, so that the load on the latter stage is reduced. Further, the minute correction can be made because the shading correction is made based on the correction table.

Third Embodiment

In the operation of the digital camera 100 with the above configuration, the operation for making the optimal shading correction based on a correction operation expression including the correction factor after correction for the image data for each light source in the photographing environment will be described below in which the correction factor is not changed for each light source (standard light, fluorescent light, mercury light, etc.) in the photographing environment, but the correction factor is corrected for each light source (standard light, fluorescent light, mercury light, etc.) in the photographing environment by a factor compensation circuit 20e.

The digital camera 100 of this embodiment comprises a storage unit 16 such as ROM, RAM or Register which stores the correction factor, the factor compensation circuit 20e which compensates the correction factor stored in the storage device 16 for the correction factor according to the light source discriminated by the light source discrimination device, and a correction operation circuit 20a which makes shading correction for the image photographed under the light source in the specific photographing environment based on the shading correction operation expression including the correction factor compensated by the factor compensation circuit 20e. The correction factor is stored not for each light source but for each RGB (e.g., correction factors A, B and C are only stored) in the storage device 16. This point is different from the first and second embodiments.

The operation of the digital camera 100 of this embodiment is the same as in the first embodiment, whereby the different points will be mainly described below with reference to FIG. 3.

That is, if the light source in the photographing environment is discriminated as the standard light (step S12: standard light), the factor compensation circuit 20e compensates each correction factor (e.g., A to C) for the correction factor according to the discriminated light source (step S14). For example, the compensation is such that A'=h1×A, B'=h2×B, . . . In this case, the correction operation circuit 20a makes the shading correction for the image data based on the shading correction operation expression including the compensated correction factor.

On the other hand, the light source in the photographing environment is discriminated as the fluorescent light, but not the standard light (step S12: other than the standard light, step S18: fluorescent light), the factor compensation circuit 20e compensates each correction factor (e.g., A to C) for the correction factor according to the discriminated light source (step S20). For example, the compensation is such that A'=h3×A, B'=h4×B, . . . In this case, the correction operation circuit 20a makes the shading correction for the image data based on the shading correction operation expression including the compensated correction factor.

Also, if the light source in the photographing environment is discriminated as the mercury light, but not the standard light, the same operation is performed.

The correction operation circuit 20a switches the table for each color (RGB) based on the reference signal or color signal from the TG (timing generator).

As described above, with the digital camera 100 of this embodiment, the factor compensation circuit 20e compensates the correction factor for the correction factor according to the light source discriminated by the light source discrimination device, and the correction operation circuit 20a makes the shading correction for the image photographed under the photographing environment based on the shading correction operation expression including the compensated correction factor. Accordingly, it is unnecessary to store the correction factor for each light source. That is, the number of man-hours in the manufacture can be reduced. Also, the circuit scale is smaller.

Fourth Embodiment

Figure 8:
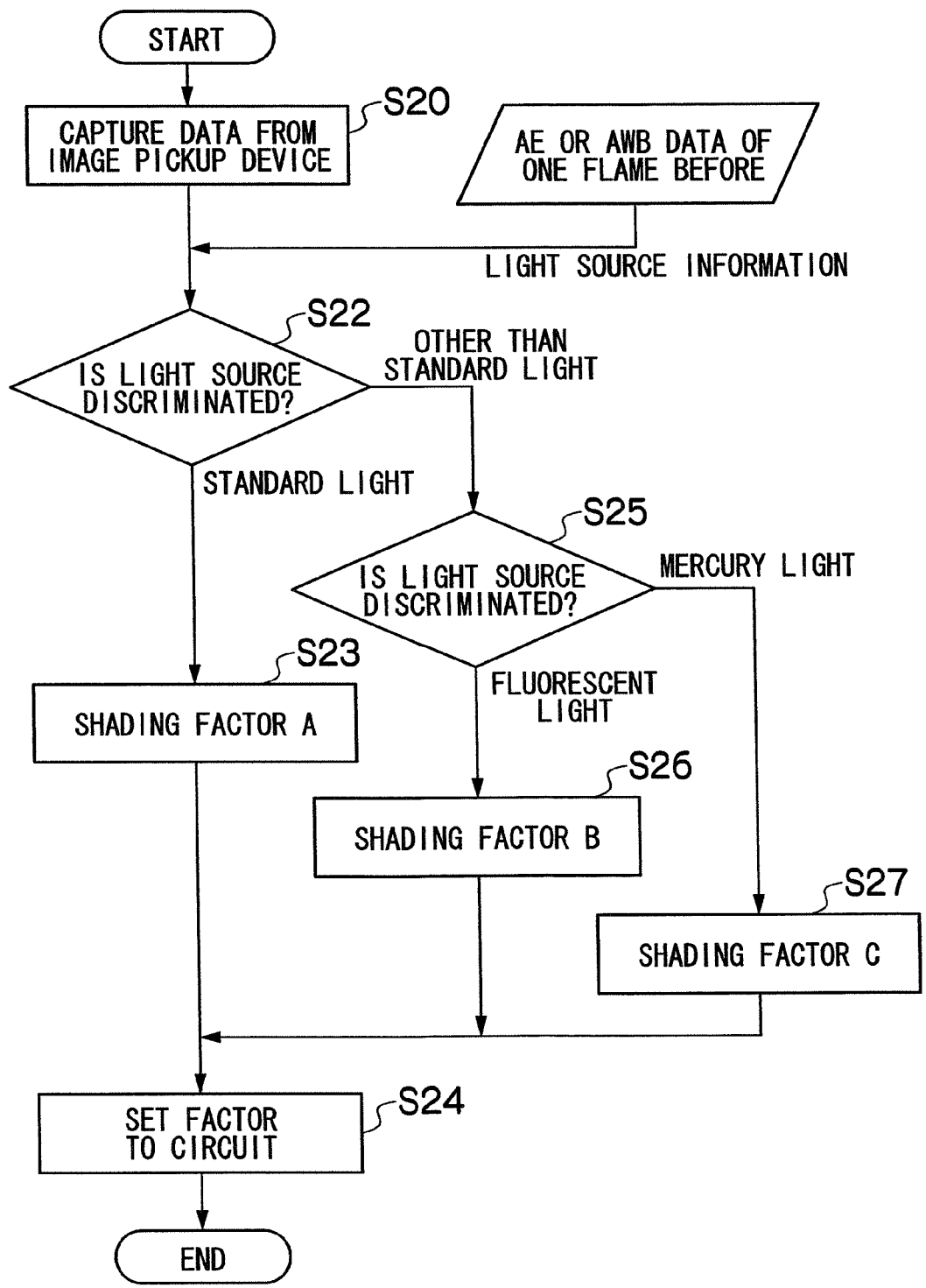
FIG. 8 is a flowchart for explaining the operation (fourth embodiment) which makes the optimal shading correction for image data under each light source in the photographing environment.

In the digital camera 100 with the above configuration, the operation for making the optimal shading correction for image data based on a correction operation expression including the correction factor for each light source in the photographing environment by changing the correction factor for each light source (standard light, fluorescent light, mercury light, etc.) in the photographing environment will be described below with reference to FIG. 8.

In the digital camera 100 of this embodiment, the light source in the photographing environment is discriminated based on not only the data captured from the image pickup device such as AE or AWB device to discriminate the light source in the photographing environment, but also the AE or AWB data of one frame before. This point is different from the first embodiment. The following process is implemented by executing a predetermined program under the control of the CPU 10.

First of all, data is captured from the image pickup device such as AE or AWB device to discriminate the light source in the photographing environment (e.g., when an image taking button is fully depressed) (step S20). Further, the AE or AWB data of one frame before is read (e.g., when the image taking button is half depressed) to discriminate the light source in the photographing environment based on the captured data (step S22).

If the light source in the photographing environment is discriminated as the standard light (step S22: standard light), the standard light correction factor A is read from the ROM 16 (step S23), and written into the storage device such as PROM, RAM or Register (step S24). That is, the correction factor is set in the correction operation circuit 20*a*. In this case, the correction operation circuit 20*a* makes the shading correction for the image data based on the correction operation expression including the written standard light correction factor A.

On the other hand, the light source in the photographing environment is discriminated as the fluorescent light, but not the standard light (step S22: other than the standard light, step S25: fluorescent light), the fluorescent light correction factor B is read from the ROM 16 (step S26), and written into the storage device such as PROM, RAM or Register (step S24). That is, the correction factor is set in the correction operation circuit 20*a*. In this case, the correction operation circuit 20*a* makes the shading correction for the image data based on the correction operation expression including the written fluorescent light correction factor B.

Also, the light source in the photographing environment is discriminated as the mercury light, but not the standard light (step S22: other than the standard light, step S25: mercury light), the mercury light correction factor C is read from the ROM 16 (step S27), and written into the storage device such as PROM, RAM or Register (step S24). That is, the correction factor is set in the correction operation circuit 20*a*. In this case, the correction operation circuit 20*a* makes the shading correction for the image data based on the correction operation expression including the written mercury light correction factor C.

As described above, with the digital camera 100 of this embodiment, the light source in the photographing environment is discriminated based on not only the data captured from the image pickup device such as AE or AWB device to discriminate the light source in the photographing environment, but also the AE or AWB data of one frame before (step S22). Accordingly, the circuit scale for judging the light source can be reduced.

Fifth Embodiment

In this embodiment, a light source discrimination device available in the digital camera 100 of each of the above embodiments will be described below.

Figure 9:
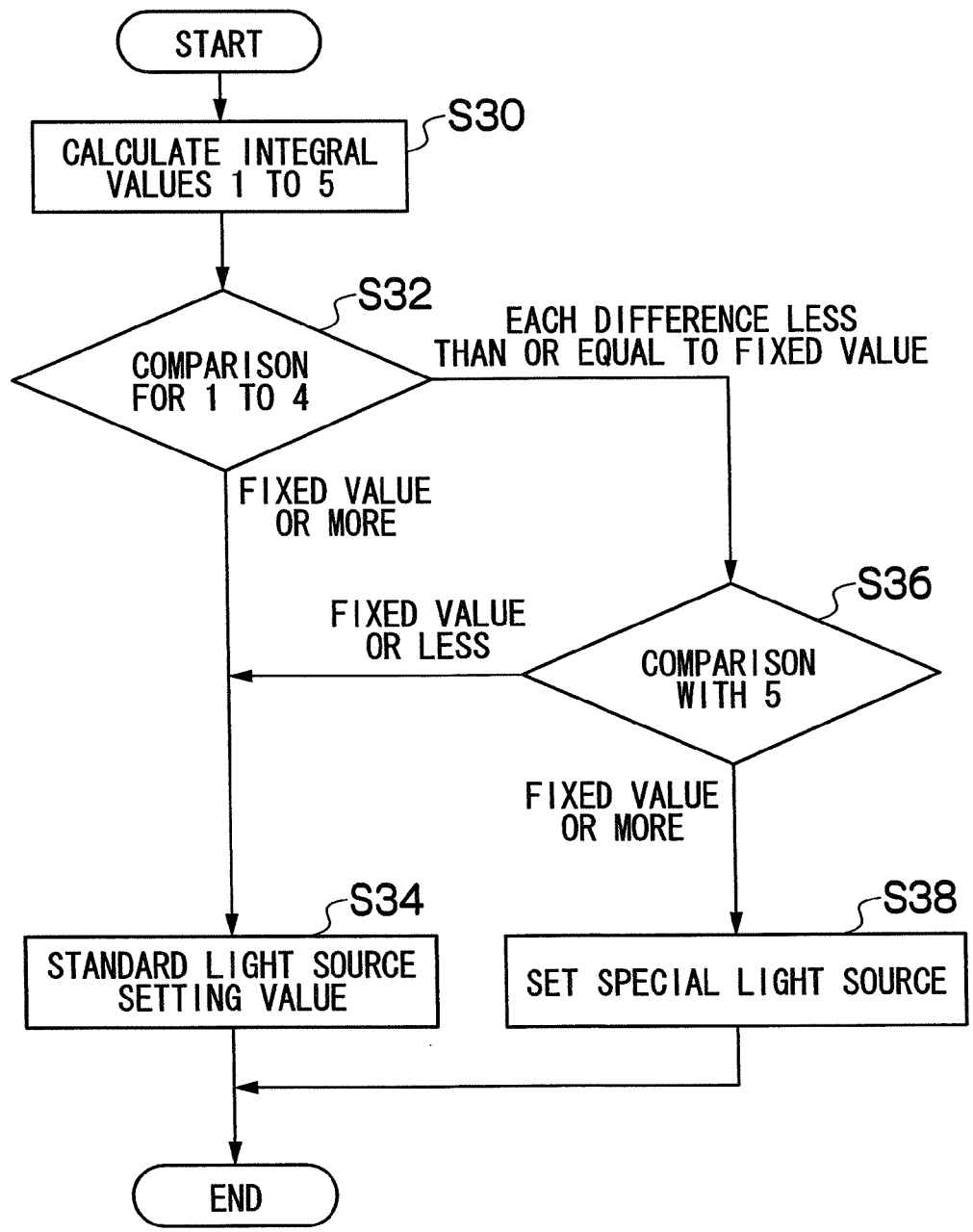
FIG. 9 is a flowchart for explaining a light source discrimination process (fifth embodiment)

FIG. 9 is a flowchart for explaining a light source discrimination process.

The following process is implemented by executing a predetermined program under the control of the CPU 10 when a so-called through image is displayed in a through image display mode set in the digital camera 100 with the above configuration.

Figure 10:
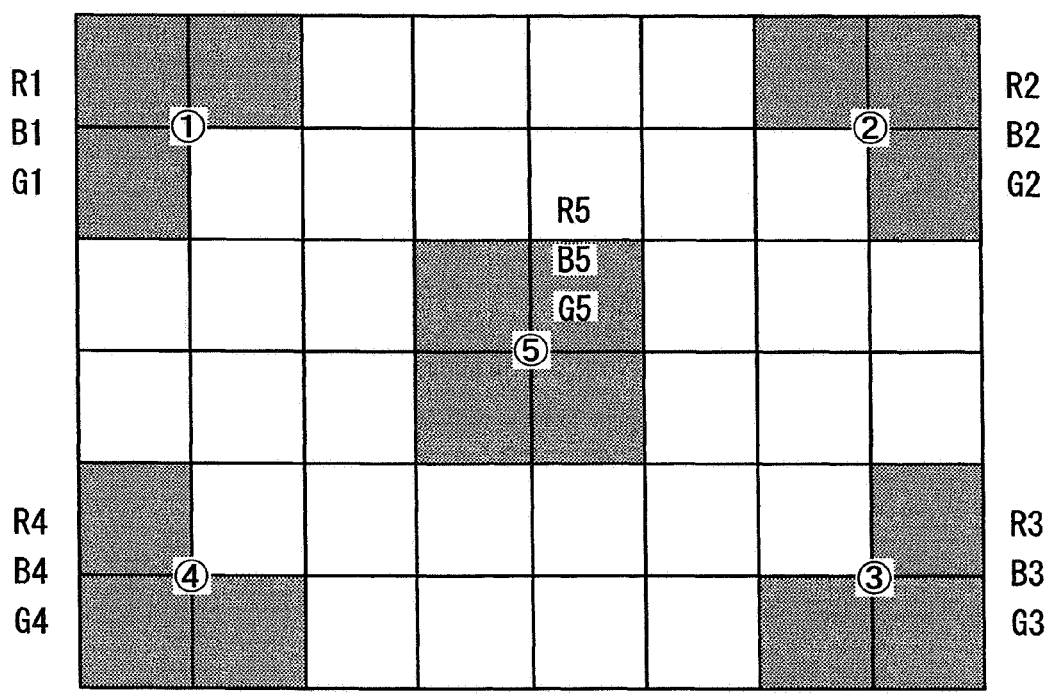
FIG. 10 is a view for explaining the areas (four corners and center) that are compared in the light source discrimination process.

The integral values at four corners and the central part of the through image are calculated to compare the color balances at four corners of the through image with the color balance at the central part while the through image is displayed (step S30). For the four corners and the central part of this through image, the areas are selected as shown in FIG. 10, for example. And the color balances at the four corners of the through image are compared with each other (step S32). If each difference is more than or equal to a fixed value (step S32: fixed value or more), the light source is judged as the standard light source, and the standard light source setting value is set (step S34).

On the other hand, the color balances at the four corners of the through image are compared with each other (step S32), and if each difference is less than or equal the fixed value (step S32: each difference equal or less than the fixed value), the color balances at the four corners and the central part of the through image are further compared with each other (step S36). If each difference is less than or equal the fixed value (step S36: fixed value or less), the light source is judged as the standard light source, and the standard light source setting value is set (step S34). On the other hand, the color balances at the four corners and the central part of the through image are compared with each other (step S36), and if each difference is more than or equal to the fixed value (step S36: fixed value or more), the light source is judged as the special light source (fluorescent light, mercury light, tungsten, etc.), and the special light source setting value is set (step S38).

With the light source discrimination device of this embodiment, in the digital camera 100 of each of the above embodiments, the light source can be judged continuously while the through image is displayed, whereby the shading correction according to the judged light source can be made. Further, the circuit scale is smaller, and the fluorescent light or the like can be detected at high speed.

Sixth Embodiment

Figure 11:
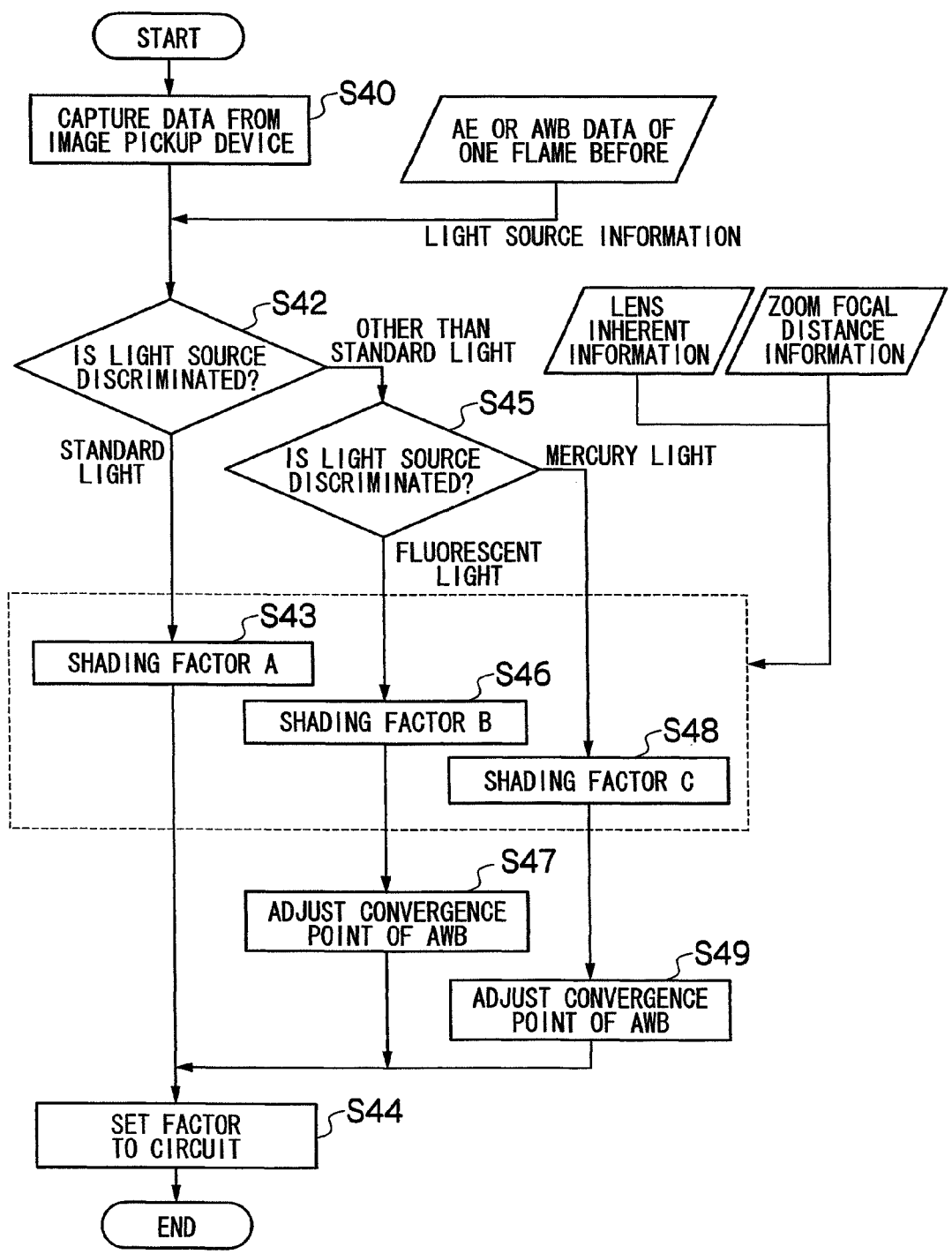
FIG. 11 is a flowchart for explaining the operation (sixth embodiment) which makes the optimal shading correction for image data under each light source in the photographing environment.

In the digital camera 100 with the above configuration, the correction factor is not only changed for each light source in the photographing environment, but also the shading information of each lens and the correction information according to the focal distance are incorporated at the time of setting the correction factor. Moreover, since the total color balance is subtly different under the influence of the shading correction, the convergence point of AWB is finely adjusted. FIG. 11 is a flowchart for explaining this process. The following process is performed by executing a predetermined program under the control of the CPU 10.

First of all, data is captured from the image pickup device such as AE or AWB device to discriminate the light source in the photographing environment (e.g., when the image taking button is fully depressed) (step S40). Further, the AE or AWB data of one frame before is read (e.g., the image taking button is half depressed) to discriminate the light source in the photographing environment based on the captured data (step S42).

If the light source in the photographing environment is discriminated as the standard light (step S42: standard light), the standard light correction factor A is read from the ROM 16

(step S43), and set in the correction operation circuit 20a (step S44). In this case, the correction operation circuit 20a makes the shading correction for the image data based on the correction operation expression including the set standard light correction factor A.

On the other hand, the light source in the photographing environment is discriminated as the fluorescent light, but not the standard light (step S42: other than the standard light, step S45: fluorescent light), the fluorescent light correction factor B is read from the ROM 16 (step S46), and set in the correction operation circuit 20a (step S44). In this case, the correction information according to the lens inherent information (shading information of each lens) and zoom focal distance information (zoom or focal distance information) is incorporated (reflected) into the correction factor. In this case, the correction operation circuit 20a makes the shading correction for the image data based on the correction operation expression including the set fluorescent light correction factor B. Also, the convergence point of AWB is adjusted according to the light source in the photographing environment (step S47). Herein, since the light source is discriminated as the fluorescent light (step S45: fluorescent light), the convergence point of AWB is adjusted to become slightly bluish image. Thereby, the proper image can be obtained by removing red from the photographed image under the fluorescent light.

Also, if the light source in the photographing environment is discriminated as the mercury light, but not the standard light (step S42: other than the standard light, step S45: mercury light), the mercury light correction factor C is read from the ROM 16 (step S48), and set in the correction operation circuit 20a (step S49). In this case, the correction information according to the lens inherent information (shading information of each lens) and zoom focal distance information (zoom or focal distance information) is incorporated (reflected) into the correction factor. In this case, the correction operation circuit 20a makes the shading correction for the image data based on the correction operation expression including the set mercury light correction factor C. Also, the convergence point of AWB is adjusted according to the light source in the photographing environment (step S49). Herein, since the light source is discriminated as the mercury light (step S45: mercury light), the convergence point of AWB is decided in the same manner as where the light source is the fluorescent light. Thereby, the proper image can be obtained from the photographed image under the mercury light.

Figure 12:
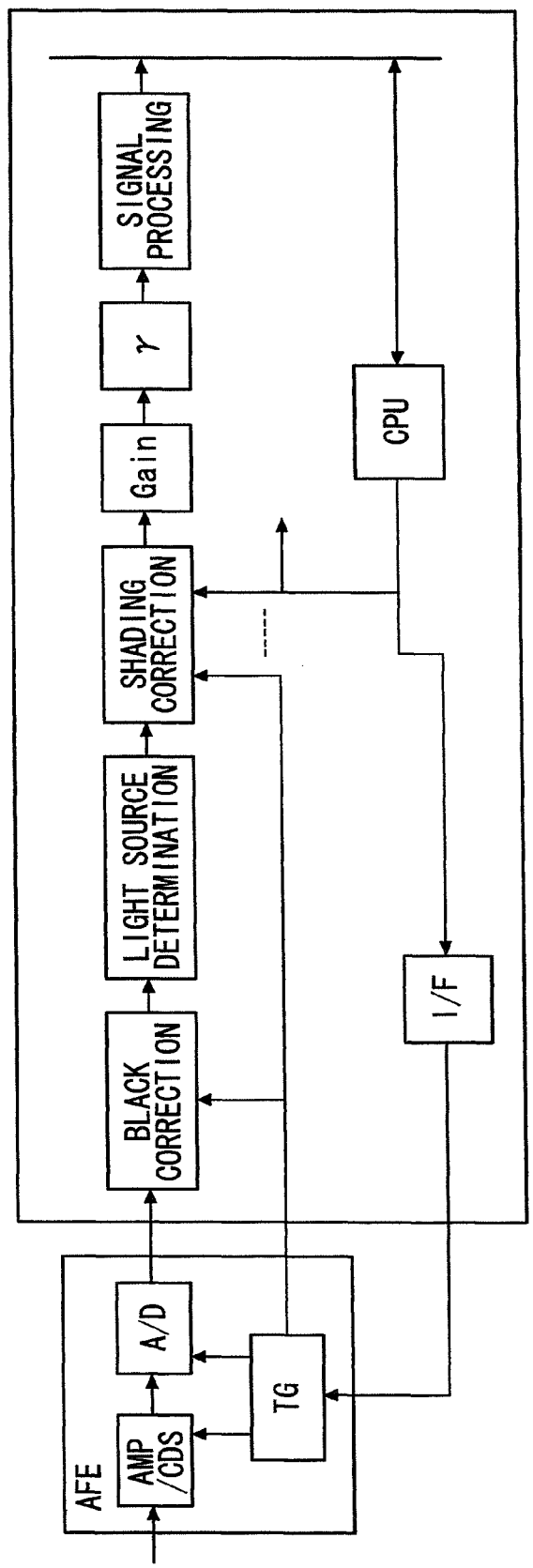
FIG. 12 is a circuit example (sixth embodiment) which makes the optimal shading correction for image data under each light source in the photographing environment.

The above process for adjusting the convergence point of AWB (auto white balance) can be implemented by a circuit as shown in FIG. 12, for example. In FIG. 12, a light source determination part is provided between a black correction part and the shading correction part in the conventional signal processing circuit.

As described above, with the digital camera 100 of this embodiment, the shading correction is made based on the correction operation expression including the correction factor to which the correction information according to the lens inherent information (shading information of each lens) and zoom focal distance information (zoom or focal distance information) is reflected. Also, the convergence point of AWB is adjusted according to the light source in the photographing environment.

Accordingly, the excellent image quality can be maintained by appropriately making shading correction even if the light source is changed, and the image quality can be improved in any optical system.

The above embodiments are only illustrative in every point. The invention shall not be interpreted as being limited to the above description. The invention may be practiced in other various ways without departing from the spirit or main features of the invention.

What is claimed is:

1. An image taking apparatus comprising:
   a light source discrimination device which discriminates a light source in a photographing environment; and
   a correction factor storage device which stores the correction factor used for shading correction for each of a plurality of light sources;
   a read device which reads a correction factor according to the light source discriminated by the light source discrimination device from the correction factor storage device;
   a shading correction device which makes shading correction for an image photographed under said light source in the photographing environment based on the correction factor read by the read device.

2. The image taking apparatus according to claim 1, further comprising a comparison device which compares color balances at four corners and a color balance at a central part of a through image while said through image is displayed,
   wherein said light source discrimination device discriminates the light source in the photographing environment, based on the comparison results of said comparison device.

3. An image taking apparatus comprising:
   a light source discrimination device which discriminates a light source in a photographing environment;
   a correction factor storage device which stores the correction factor used for shading correction for each of a plurality of light sources;
   a read device which reads a correction factor according to the light source discriminated by the light source discrimination device from the correction factor storage device;
   a storage device which stores a correction factor;
   a write device which writes the correction factor read by the read device into said storage device; and
   a shading correction device which makes shading correction for an image photographed under said light source in the photographing environment based on a shading correction operation expression including the correction factor stored in said storage device.

4. The image taking apparatus according to claim 3, wherein said light source discrimination device discriminates the light source in the photographing environment, based on light source information obtained from an image pickup device and light source information of one frame before.

5. The image taking apparatus according to claim 3, further comprising a comparison device which compares color balances at four corners and a color balance at a central part of a through image while said through image is displayed,
   wherein said light source discrimination device discriminates the light source in the photographing environment, based on the comparison results of said comparison device.

6. The image taking apparatus according to claim 4, further comprising a comparison device which compares color balances at four corners and a color balance at a central part of a through image while said through image is displayed,
   wherein said light source discrimination device discriminates the light source in the photographing environment, based on the comparison results of said comparison device.

7. The image taking apparatus according to claim 3, wherein correction information according to lens inherent information and zoom focal distance information is reflected to the correction factor included in said shading correction operation expression, and said image taking apparatus further comprises an adjustment device which adjusts the convergence point of automatic white balance according to the light source in the photographing environment discriminated by said light source discrimination device.

8. An image taking apparatus comprising:

a light source discrimination device which discriminates a light source in a photographing environment;

a storage device which stores a correction factor for each of a plurality of light sources;

a selector which switches to a correction factor according to the light source discriminated by said light source discrimination device among the correction factors stored in said storage device, based on the discrimination result of said light source discrimination device; and a shading correction device which makes shading correction for an image photographed under said light source in the photographing environment, based on a shading correction operation expression including the correction factor switched by said selector, wherein said light source discrimination device is disposed before said shading correction device.

9. The image taking apparatus according to claim 8, further comprising a comparison device which compares color balances at four corners and a color balance at a central part of a through image while said through image is displayed, wherein said light source discrimination device discriminates the light source in the photographing environment, based on the comparison results of said comparison device.

10. The image taking apparatus according to claim 8, wherein correction information according to lens inherent information and zoom focal distance information is reflected to the correction factor included in said shading correction operation expression, and said image taking apparatus further comprises an adjustment device which adjusts the convergence point of automatic white balance according to the light source in the photographing environment discriminated by said light source discrimination device.

11. An image taking apparatus comprising:

a light source discrimination device which discriminates a light source in a photographing environment;

a storage device which stores a correction table for each of a plurality of light sources;

a selector which switches to a correction table according to the light source discriminated by said light source discrimination device among the correction tables stored in said storage device, based on the discrimination result of said light source discrimination device; and a shading correction device which makes shading correction for an image photographed under said light source in the photographing environment, based on the correction table switched by said selector, wherein said light source discrimination device is disposed before said shading correction device.

12. The image taking apparatus according to claim 11, further comprising a comparison device which compares color balances at four corners and a color balance at a central part of a through image while said through image is displayed, wherein said light source discrimination device discriminates the light source in the photographing environment, based on the comparison results of said comparison device.

* * * * *